(12) United States Patent  
Ponting

(10) Patent No.: US 8,902,508 B2  
(45) Date of Patent: Dec. 2, 2014

(54) CONSOLIDATED MULTILAYERED GRADIENT REFRACTIVE INDEX OPTICAL MATERIALS

(71) Applicant: PolymerPlus LLC, Valley View, OH (US)

(72) Inventor: Michael T. Ponting, Cleveland Heights, OH (US)

(73) Assignee: Case Western Reserve University, Cleveland, OH (US)

(*) Notice: Subject to any disclaimer, the term of this patent is extended or adjusted under 35 U.S.C. 154(b) by 129 days.

(21) Appl. No.: 13/751,919

(22) Filed: Jan. 28, 2013

(65) Prior Publication Data

US 2013/0194677 A1    Aug. 1, 2013

Related U.S. Application Data

(60) Provisional application No. 61/591,542, filed on Jan. 27, 2012.

(51) Int. Cl.
- *G02B 3/00* (2006.01)
- *B29D 11/00* (2006.01)
- *G02B 6/00* (2006.01)
- *G02B 1/04* (2006.01)

(52) U.S. Cl.
CPC ............ *G02B 1/041* (2013.01); *B29D 11/0073* (2013.01); *G02B 3/0087* (2013.01); *G02B 6/00* (2013.01)
USPC ............................ 359/652; 359/653; 359/654

(58) Field of Classification Search
USPC ........................................... 359/652, 653, 654
See application file for complete search history.

(56) References Cited

U.S. PATENT DOCUMENTS

| | | | |
|---|---|---|---|
| 4,657,344 A | 4/1987 | Suzuki et al. | |
| 4,794,435 A | 12/1988 | Suzuki et al. | |
| 4,956,000 A | 9/1990 | Reeber et al. | |
| 5,044,737 A * | 9/1991 | Blankenbecler | 359/653 |
| 5,541,774 A | 7/1996 | Blankenbecler | |
| 5,689,374 A | 11/1997 | Xu et al. | |
| 5,861,934 A | 1/1999 | Blum et al. | |
| 6,606,199 B2 | 8/2003 | Wang | |
| 7,002,754 B2 | 2/2006 | Baer et al. | |
| 7,936,802 B2 | 5/2011 | Singer et al. | |
| 8,144,744 B2 | 3/2012 | Singer et al. | |
| 2004/0042729 A1* | 3/2004 | Zhou et al. | 385/49 |
| 2004/0105163 A1 | 6/2004 | Bryan et al. | |

* cited by examiner

*Primary Examiner* — James Jones

(74) *Attorney, Agent, or Firm* — Tarolli, Sundheim, Covell & Tummino LLP

(57) ABSTRACT

A consolidated multilayered GRIN optical material includes a multilayered composite GRIN sheet that includes a plurality of consolidated coextruded multilayered polymer films. Each of the multilayered polymer films includes a plurality of at least two alternating layers (A) and (B). Layer (A) includes a first blend of polymer components and layer (B) includes a second blend of polymer components. The multilayered composite GRIN sheet has an external optical transmission of at least 80% at a wavelength of 633 nm measured using UV-VIS spectroscopy and is free of intralayer polymer domains at least 1 micron size scale in any dimension.

25 Claims, 2 Drawing Sheets

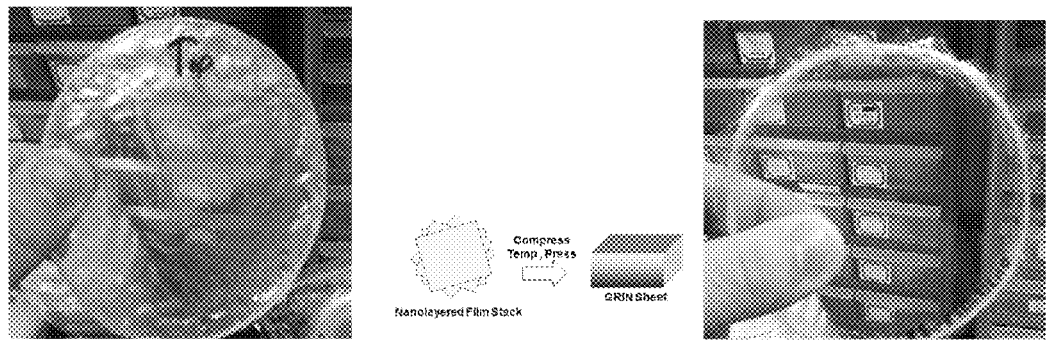
Fig. 3
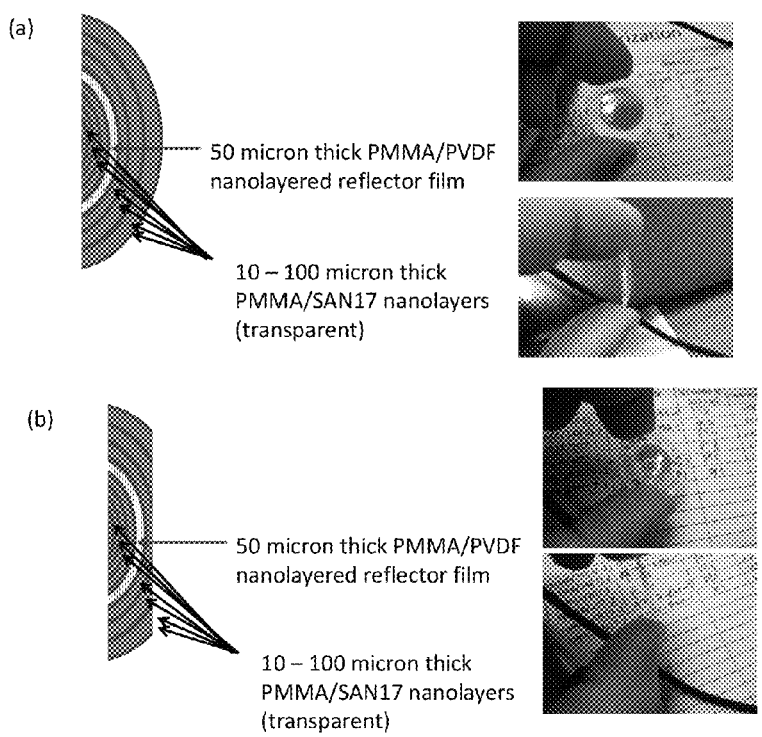
Figs. 4A-B

CONSOLIDATED MULTILAYERED GRADIENT REFRACTIVE INDEX OPTICAL MATERIALS

RELATED APPLICATION

This application claims priority from U.S. Provisional Application No. 61/591,542, filed Jan. 27, 2012, the subject matter of which is incorporated herein by reference in its entirety.

BACKGROUND

Gradient refractive index (GRIN) optics are well known and are the subject of recent reviews. In a conventional lens, an incoming light ray is refracted when it enters the shaped lens surface because of the abrupt change of the refractive index from air to the homogeneous material. The surface shape of the lens determines the focusing and imaging properties of the lens.

In a gradient refractive index (GRIN) lens there is a continuous variation of the refractive index within the lens material. In a simple GRIN lens, plane optical surfaces can be used. The light rays are continuously bent within the lens. The focusing properties are determined by the variation of refractive index within the lens material. There are two gradient index (GRIN) lens types described in the literature: axial gradient and radial/cylindrical/spherical gradient. In the axial gradient, the refractive index varies in a continuous way along the optical axis of the inhomogeneous medium. In the axial gradient, the surfaces of constant index are planes perpendicular to the optical axis. In the radial/cylindrical/spherical the index profile varies continuously from the optical axis to the periphery along the transverse direction in such a way that the surfaces of constant index are concentric spheres or cylinders about the optical axis.

The simple geometry of a GRIN lens with flat surfaces allows the efficient production and simplified assembly of systems of lenses. Varying the thickness of the lens can vary the lens parameters such as the focal length and working distance. Thin lenses down to 0.02 mm in thickness are possible. Alternatively, spherical, ball-like, GRIN lenses allow an image plane to be made to lie directly on the exit surface of the lens.

A conventional lens with spherical surfaces and with a homogeneous index of refraction will not focus light perfectly; there will be spherical and chromatic aberrations. It is also well known in the art that these aberrations can be reduced or eliminated by employing axial gradient lens blanks. An axial gradient lens is a lens that has an index of refraction profile that varies in one direction only, usually chosen to be the optical axis. These aberration free lenses can be used advantageously in a variety of optical systems, such as slide projectors, cameras, binoculars, and many other imaging devices. The number of lens elements required for a given task can be reduced as well as the weight and complexity of the system.

Nanolayered coextrusion of polymer materials has been previously described for production of transparent films of a tailorable refractive index. A subsequent stacking and consolidation of these nanolayered films has been shown to produce polymer parts with a designable internal refractive index distribution in two or three part directions. A requirement for the previously described GRIN objects to perform as optics or lenses is fabrication of highly transparent optical parts. Internal scatter inclusions in the GRIN objects resulting from internal structure of the nanolayered film or deriving from the bonding of individual nanolayered films into a gradient refractive index sheet can result in a loss of GRIN optic functionality.

U.S. Pat. No. 5,262,896 describes the fabrication of axial gradient lenses by the controlled diffusion process. The blanks for the fabrication of such gradient lenses can be made by a variety of processes, such as SOL-GEL, infusion, and diffusion and may be glass, plastic or other suitable optical material.

U.S. Pat. No. 4,956,000 describes a method and apparatus for fabricating a lens having a radially non-uniform but axially symmetrical distribution of lens material, in which the lens size and shape is determined by the selective direction and condensation of vaporized lens material onto a substrate.

U.S. Pat. No. 5,236,486 describes the forming of a cylindrical or spherical gradient lens blank from an axial gradient lens blank by heat molding (slumping). This process produces a monolithic lens with a continuous index of refraction profile.

U.S. Pat. No. 7,002,754 describes a hierarchically multilayered polymer composite for graded index of refraction (GRIN) lenses and a method to fabricate the same.

SUMMARY

Embodiments described herein relate to consolidated multilayered GRIN optical materials, methods of fabricating the consolidated multilayered GRIN optical materials, and GRIN lenses formed from the consolidated multilayered GRIN optical materials. The consolidated multilayered GRIN optical materials can include a multilayered composite GRIN sheet that comprises a plurality of consolidated coextruded multilayered polymer films. Each of the coextruded multilayered polymer films can include a plurality of at least two alternating layers (A) and (B) represented by formula $(AB)_x$, where $x=2^n$, and n is in the range of from 4 to 18. Each layer (A) includes a first blend of polymer components (e.g., polymer component (a) and polymer component (b)), and each layer (B) includes a second blend of polymer components (e.g., polymer component $(a_1)$ and polymer component $(b_1)$). The multilayered composite GRIN sheet used to form the consolidated multilayered GRIN optical material can have an external optical transmission of at least 80% at a wavelength of 633 nm measured using UV-VIS spectroscopy and be free of intralayer polymer domains at least 1 micron size scale in any dimension. The consolidated multilayered GRIN optical material can also exhibit an index gradient in the range of from 0.02 to 2.0. In some embodiments, the multilayered composite GRIN sheet can have an external optical transmission of at least 85%, at least 86%, at least 87%, at least 88%, at least 89%, or at least 90% at a wavelength of 633 nm measured using UV-VIS spectroscopy.

In some embodiments, the first polymer blend can include at least two polymer components $(a_1)$ and $(b_1)$, at least three polymer components $(a_1)$, $(b_1)$, and $(c_1)$, at least four polymer components $(a_1)$, $(b_1)$, $(c_1)$, and $(d_1)$, or more. The second polymer blend can include at least two polymer components $(a_1)$ and $(b_1)$, at least three polymer components $(a_1)$, $(b_1)$, and $(c_1)$, at least four polymer components $(a_1)$, $(b_1)$, $(c_1)$, and $(d_1)$, or more. In some embodiments, the polymer components of the first polymer blend can be the same as the polymer components of the second polymer blend. For example, the first polymer blend can include polymer components (a) and (b) and the second polymer blend can include polymer components $(a_1)$ and $(b_1)$. Polymer component (a) can be the same as polymer component $(a_1)$, and polymer component (b) can be the same as polymer component $(b_1)$.

In some embodiments, where polymer component (a) is the same as polymer component ($a_1$), and polymer component (b) is the same as polymer component ($b_1$), the ratio of polymer components (a) and (b) in layer (A) is substantially equal to the ratio of polymer components ($a_1$) and ($b_1$) in layer (B). In other embodiments, where polymer component (a) is the same as polymer component ($a_1$), and polymer component (b) is the same as polymer component ($b_1$), the ratio of the polymer components (a) and (b) in layer (A) and the ratio of ($a_1$) and ($b_1$) in layer (B) is substantially equal to the ratio of components (a), (b), ($a_1$), and ($b_1$) in the multilayered composite GRIN sheet. In still other embodiments, the layers (A) and (B) can each have a substantially uniform nano-layer thickness of from 5 nm to 1,000 nm.

In some embodiments, the coextruded multilayered polymer films are stacked in ordered layers to form a hierarchical multilayered composite GRIN sheet. The adjacent coextruded multilayered polymer films can be chosen to exhibit progressively different refractive indexes.

In yet other embodiments, the coextruded multilayered polymer film can include about 50 to about 500,000 alternating layers, and the multilayered composite GRIN sheet can include about 5 to about 100,000 multilayered polymer composite films.

In still other embodiments, the polymer components are individually selected from the group consisting of a polyethylene naphthalate, an isomer thereof, a polyalkylene terephthalate, a polyimide, a polyetherimide, a styrenic polymer, a polycarbonate, a poly(meth)acrylate, a cellulose derivative, a polyalkylene polymer, a fluorinated polymer, a chlorinated polymer, a polysulfone, a polyethersulfone, polyacrylonitrile, a polyamide, polyvinylacetate, a polyether-amide, a styrene-acrylonitrile copolymer, a styrene-ethylene copolymer, poly(ethylene-1,4-cyclohexylenedimethylene terephthalate), polyvinylidene difluoride, an acrylic rubber, isoprene, isobutylene-isoprene, butadiene rubber, butadiene-styrene-vinyl pyridine, butyl rubber, polyethylene, chloroprene, epichlorohydrin rubber, ethylene-propylene, ethylene-propylene-diene, nitrile-butadiene, polyisoprene, silicon rubber, styrene-butadiene, urethane rubber, and polyoxyethylene, polyoxypropylene, and tetrafluoroethylene hexafluoropropylene vinylidene (THV), aromatic polyesters, aromatic polyamides, and ethylene norbornene copolymers. The polymer components can be miscible, immiscible or partially miscible polymeric materials.

In some embodiments, the layers further comprise an organic or inorganic material designed to affect the refractive index. The consolidated multilayered GRIN optical materials can also include at least one reflector or filter layer.

Other embodiments described herein relate to a method forming a GRIN lens. The GRIN lens can be formed by co-extruding a first polymer blend and a second polymer blend to form a coextruded plurality multilayered polymer film. Each of the coextruded multilayered polymer films can include a plurality of at least two alternating layers (A) and (B) represented by formula $(AB)_x$, where $x=2^n$, and n is in the range of from 4 to 18. Layer (A) can include a first blend of polymer components (e.g., polymer component (a) and polymer component (b)), and layer (B) can include a second blend of polymer components (e.g., polymer component ($a_1$) and polymer component ($b_1$)). The plurality of the coextruded multilayered polymer films can then be consolidated into a multilayer composite GRIN sheet. The consolidated multilayered composite GRIN sheet can have an external optical transmission of at least 80% at a wavelength of 633 nm measured using UV-VIS spectroscopy and be free of intra-layer polymer domains at least 1 micron size scale in any dimension. The multilayered composite GRIN sheet can then be shaped into a GRIN lens.

BRIEF DESCRIPTION OF THE DRAWINGS

FIG. 3 illustrates (Left) Consolidated nanolayered PMMA/SAN17 films into a gradient refractive index sheet and (Right) consolidated nanolayered blend films of PMMA/SAN17 into a gradient refractive index sheet. Composition of the two sheets are identical, i.e., same order/RI of nanolayered films, the only difference is that films consolidated into the image on the right were comprised of nanolayered blend layers similar to FIG. 1.

FIGS. 4(a-b) are a sketch and image of (a) 20 mm diameter plano convex GRIN lens with internally incorporated multilayered polymer film visible light reflective filter and (b) 20 mm flat GRIN lens with an internal annular visible light reflective multilayered film ring.

DETAILED DESCRIPTION

Figure 1:
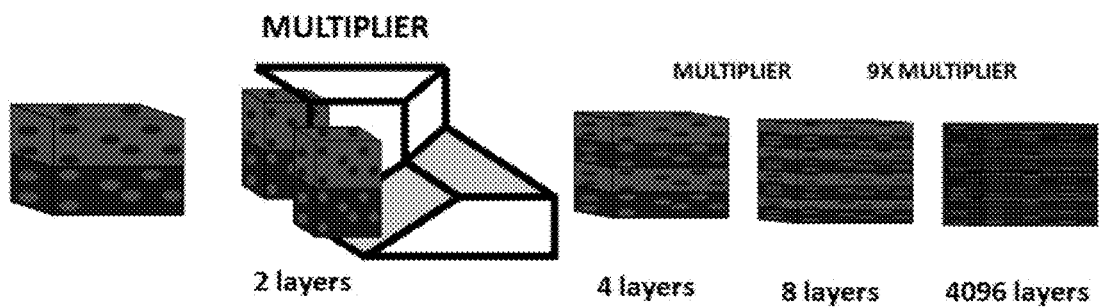
FIG. 1 is a schematic illustration depicting the layer multiplication of intra-layer polymer blends into a multilayered polymer film.

This application relates to consolidated multilayered GRIN optical materials, methods of forming consolidated multilayered GRIN optical materials, and to their use in forming gradient refractive index (GRIN) lenses. The consolidated multilayered GRIN optical materials can include a multilayered composite GRIN sheet that comprises a plurality of consolidated coextruded multilayered polymer films. Each of the coextruded multilayered polymer films can include intra-layer polymer blends to compatibilize and limit layered film stresses to produce high quality consolidated or gradient index optical materials. The coextruded multilayered polymer films can include alternating polymer layers that can be formed of compatibilized blends of at least two polymers. The inclusion of compatibilized polymer blends in the multilayered GRIN fabrication process can off-set variation in polymer material feedstock molecular weight, which can adversely affect optical properties of the consolidated multilayered GRIN optical materials and GRIN lenses formed from the materials. Improved consolidated multilayered GRIN optical materials fabricated from the consolidated coextruded multilayered films with polymer blend layers allows for production of optical lenses/elements capable of the high transmission/low scattering, which is often required for imaging technologies.

The multilayering of intra-layer polymer blends can be utilized to not only reduce interfacial phenomenon between individual layers and consolidated sheets formed from the multilayered films, but also maintain a nanometer sized polymer domain structure. Introduction of micron sized polymer domains, e.g., micron sized intra-layer polymer blend domains, can result in the optical scattering and loss of film transparency and render the film useless for production of optics. Providing polymer blends within the intra-layered structure ensures that none of the intra-layer domains can grow to the micron size scale (e.g., at least 1 micron size scale in any dimension), which could introduce additional transmission losses in the coextruded multilayered polymer films. The compatiblization of inter-film forces during consolidation into GRIN sheet was only recently discovered during scale-up of GRIN optics fabrication. The introduction of the intra-layer blend materials has led to a relaxation of bulk film internal stresses, which result as the layer-layer interface between two polymer structures is increased as the number of layers is increased. Relying on optics fabrication from the consolidation of hundreds of individual layered films, each containing more than 4,000 interfaces/layers, multilayered GRIN optics provides a unique case where a critical mass of multilayered film interfaces in a single part can allow for measurable effects of internal part stress. The discovery of optical transmission deterioration in the multilayered GRIN optics most likely represents the first known occurrence of this phenomenon.

Consolidation of coextruded multilayered polymer films has applications in the production of GRIN objects, such as GRIN lenses. Combining multilayered films of differing refractive index has been shown as an unique approach to the fabrication of internal lens or optic refractive index distribution previously unattainable via imbibing/diffusion or co-polymerization methods. Low optical scattering and transmission losses can be maintained by consolidation of coextruded multilayered films comprised of polymer blend layers compared to homogenous polymer layers. Using polymer blend layers can also lead to an identification of a wider layered polymer film processing window and/or acceptance of polymer materials to the film layering process, which were previously not processable into multilayered films for further optics manufacturing. Moreover, the use of polymer blends to form the coextruded multilayer polymer films allows enhanced consolidation of films of a slightly different material composition (e.g., consolidate a PMMA/PVDFb film into a sheet of PMMA/SAN17).

In some embodiments, the consolidated multilayered GRIN optical materials can be fabricated in a multi-stage process. In the multi-stage process, a set of coextruded multilayered polymer films can be fabricated. Each polymer film can have a different refractive index. An ordered set of these multilayered polymer films can be assembled or consolidated into the hierarchical multilayered composite GRIN sheet with a desired index gradient. The assembled or consolidated multilayered composite GRIN sheet can form a consolidated multilayered GRIN optical material, which can then be shaped into a spherical or an aspherical lens with a spherical or an aspheric GRIN distribution.

The multilayered polymer films used to form the hierarchical structure of consolidated multilayered GRIN optical material can include up to 500,000 layers alternating between at least two types: (A) and (B). Layers of type (A) are formed of a first polymer blend that is composed of a blend of at least at least two polymer components (e.g., polymer component (a) and polymer component (b)). Layers of type (B) are formed of a second polymer blend that is composed of a blend of at least at least two polymer components (e.g., polymer component $(a_1)$ and polymer component $(b_1)$).

In some embodiments, the first polymer blend can include at least two polymer components $(a_1)$ and $(b_1)$, at least three polymer components $(a_1)$, $(b_1)$, and $(c_1)$, at least four polymer components $(a_1)$, $(b_1)$, $(c_1)$, and $(d_1)$, or more. In other embodiments, the second polymer blend can include at least two polymer components $(a_1)$ and $(b_1)$, at least three polymer components $(a_1)$, $(b_1)$, and $(c_1)$, at least four polymer components $(a_1)$, $(b_1)$, $(c_1)$, and $(d_1)$, or more. In some embodiments, the polymer components of the first polymer blend can be the same as the polymer components of the second polymer blend. For example, the first polymer blend can include polymer components (a) and (b) and the second polymer blend can include polymer components $(a_1)$ and $(b_1)$. Polymer component (a) can be the same as polymer component $(a_1)$, and polymer component (b) can be the same as polymer component $(b_1)$.

The refractive index, the optical transmission, and optical dispersion or Abbe number of the multilayer polymer film can be varied by varying the amount, ratio, or percentage of the polymer components (e.g., polymer component (a) and/or polymer component (b)) of layers (A) as well as the polymer components (e.g., polymer component $(a_1)$ and/or polymer component $(b_1)$) of layers (B). In some embodiments, layer A can include less than about 10 wt. % polymer component (a) and greater than about 90 wt. % polymer component (b), less than about 25 wt. % polymer component (a) and greater than about 75 wt. % polymer component (b), less than about 50 wt. % polymer component (a) and greater than about 50 wt. % polymer component (b), greater than about 50 wt. % polymer component (a) and less than about 50 wt. % polymer component (b), greater than about 75 wt. % polymer component (a) and less than about 25 wt. % polymer component (b), or greater than about 90 wt. % polymer component (a) and less than about 10 wt. % polymer component (b).

In other embodiments, layer B can include less than about 10 wt. % polymer component $(a_1)$ and greater than about 90 wt. % polymer component $(b_1)$, less than about 25 wt. % polymer component $(a_1)$ and greater than about 75 wt. % polymer component $(b_1)$, less than about 50 wt. % polymer component $(a_1)$ and greater than about 50 wt. % polymer component $(b_1)$, greater than about 50 wt. % polymer component $(a_1)$ and less than about 50 wt. % polymer component $(b_1)$, greater than about 75 wt. % polymer component $(a_1)$ and less than about 25 wt. % polymer component $(b_1)$, or greater than about 90 wt. % polymer component $(a_1)$ and less than about 10 wt. % polymer component $(b_1)$.

In some embodiments, where the polymer components of layers (A) and (B) are the same (e.g., where polymer component (a) is the same as polymer component $(a_1)$, and polymer component (b) is the same as polymer component $(b_1)$), the ratio of the polymer components in layer (A) is substantially equal to the ratio of polymer components in layer (B). In still other embodiments, where the polymer components of layers (A) and (B) are the same, the ratio of the polymer components in layers (A) and the ratio of polymer components in layer (B) is substantially equal to the ratio of components in the multilayered composite GRIN sheet.

In some embodiments, each of the layers (A) and (B) of the multilayered polymer film may have a nanolayer thickness. By nanolayer thickness it is meant that each layers (A) and (B) has a sub micron thickness and is preferably less than about 1000 nm, less than about 500 nm, less than about 100 nm, less than about 50 nm, less than about 25 nm, or less than about 10 nm.

In other embodiments, each of the layers (A) and (B) can have a substantially uniform thickness in the range of about 5 nm to about 1,000 nm, about 5 nm to about 500 nm, about 5 nm to about 100 nm, about 5 nm to about 50 nm, about 5 nm to about 25 nm, or about 5 nm to about 10 nm.

The term "about" is used herein to denote a deviation from the stated value. The polymeric materials used in the alternating layers are preferably optically transparent at the layer thicknesses. The layer thickness can be varied or chirped to provide variable transparency, filtering, or reflectivity over a broad band of wavelengths and acceptance angles. Preferably, the layers have substantially uniform layer thickness, where "substantially" is used to denote a deviation within 20%.

A wide variety of polymeric materials can be used as the polymer components (e.g., (a), $(a_1)$, (b), $(b_1)$, (c), $(c_1)$, etc.) to form the layers (A) and (B). Such materials can include but are not limited to elastomers, thermoplastic, and/or oligomeric materials. The term "polymer" or "polymeric material" as used herein denotes a material having a weight average molecular weight (MW) of at least 5,000. The polymer may, for example, be an organic polymeric material. The term "oligomer" or "oligomeric material" as used herein denotes a material having a weight average MW from 1,000 to less than 5,000. Such oligomeric materials can be, for example, glassy, crystalline or elastomeric polymeric materials.

Examples of polymeric materials that can be used as the polymer components (e.g., (a), ($a_1$), (b), ($b_1$), (c), ($c_1$), etc.) to form the layers (A) and (B) can include but are not limited to aliphatic, polycarbonate based thermoplastic polyurethanes, thermoplastic elastomers, polytetramethylene glycol based polyurethane elastomers, polyethylene naphthalate and isomers thereof, such as 2,6-, 1,4-, 1,5-, 2,7-, and 2,3-polyethylene naphthalate; polyalkylene terephthalates such as polyethylene terephthalate, polybutylene terephthalate, and poly-1,4-cyclohexanedimethylene terephthalate; aromatic polyesters (e.g., Osaka Gas Company OKP4 and OKP4HT), polyimides, such as polyacrylic imides; polyetherimides; styrenic polymers, such as atactic, isotactic and syndiotactic polystyrene, α-methyl-polystyrene, para-methyl-polystyrene; polycarbonates such as bisphenol-A-polycarbonate (PC); poly(meth)acrylates such as glassy poly(methyl methacrylate), poly(methyl methacrylate), poly(isobutyl methacrylate), poly(propyl methacrylate), poly(ethyl methacrylate), poly(butyl acrylate) and poly(methyl acrylate) (the term "(meth)acrylate" is used herein to denote acrylate or methacrylate); cellulose derivatives, such as ethyl cellulose, cellulose acetate, cellulose propionate, cellulose acetate butyrate, and cellulose nitrate; polyalkylene polymers, such as polyethylene, polypropylene, polybutylene, polyisobutylene, and poly(4-methyl)pentene; fluorinated polymers, such as perfluoroalkoxy resins, polytetrafluoroethylene, fluorinated ethylene-propylene copolymers, polyvinylidene fluoride, and polychlorotrifluoroethylene and copolymers thereof; chlorinated polymers, such as polydichlorostyrene, polyvinylidene chloride and polyvinylchloride; polysulfones; polyethersulfones; polyacrylonitrile; polyamides; polyvinylacetate; aromatic polyamides (e.g., amorphous nylons, such as Dupont Sellar or EMS G21), and polyether-amides.

Other polymer materials that can be used as the polymer components to form layers A and B are copolymers, such as styrene-acrylonitrile copolymer (SAN), for example, containing between 10 and 50 wt %, or between 20 and 40 wt %, acrylonitrile, SAN-17, styrene-ethylene copolymer; and poly(ethylene-1,4-cyclohexylenedimethylene terephthalate) (PETG). Additional polymeric materials include an acrylic rubber; electro-optic polymers, such as polyoxyethylene (EO) or polyoxypropylene (PO); tetrafluoroethylene hexafluoropropylene vinylidene (THV); isoprene (IR); isobutylene-isoprene (IIR); butadiene rubber (BR); butadiene-styrene-vinyl pyridine (PSBR); butyl rubber; polyethylene; chloroprene (CR); epichlorohydrin rubber; ethylene-propylene (EPM); ethylene-propylene-diene (EPDM); nitrile-butadiene (NBR); polyisoprene; silicon rubber; styrene-butadiene (SBR); ethylene norbornene copolymers (e.g., Zeonex, and Topaz), and urethane rubber. Still, additional polymeric materials include liquid crystalline polymers, copolymers, and block or graft copolymers.

In some embodiments, the polymer components (e.g., (a) and (b)) of the first polymer blend of layers (A) and the polymer components (e.g., ($a_1$) and ($b_1$)) of the second polymer blend of layers (B) can be substantially miscible. Alternatively, one or more of the components (e.g., (a) and (b), and/or ($a_1$) and ($b_1$)) of the first polymer blend and the second polymer blend may be immiscible or partially miscible.

In one example, polymer components (a) and ($a_1$) can be poly(methyl methacrylate) and polymer components (b) and ($b_1$) can be a styrene-acrylonitrile copolymer (SAN). In another example, polymer components (a) and ($a_1$) can be poly(methyl methacrylate) and polymer components (b) and ($b_1$) can be a polyvinylidene fluoride.

One consideration in selecting the materials for the composite GRIN sheet is the difference in refractive index between the polymeric components (e.g., (a) and (b)) of the layers (A) and the polymer components (e.g., ($a_1$) and ($b_1$)) of the layers (B). In particular, the maximum index gradient of the multilayer polymer composite and, thus, the GRIN sheet is dictated by the difference between the indexes of the polymer components (e.g., (a) and (b)) of the layers (A) and the polymer components (e.g., ($a_1$) and ($b_1$)) of the layers (B). The focal length, the thickness, and the shape of the GRIN lens likewise depend on the index gradient that can be achieved. Accordingly, one or more of the polymer components (e.g., (a) and (b)) of the layers (A) and the polymer components (e.g., ($a_1$) and ($b_1$)) of the layers (B) of the multilayer film can include dispersed organic or inorganic materials designed to increase or decrease the refractive index of the component. The organic or inorganic materials may include, for example, nanoparticulate materials, dyes, and/or other additives.

It is preferred that the dispersed inorganic or organic material is substantially optically transparent. Accordingly, it is preferred that the dispersed material is miscible with the polymeric materials, has a refractive index substantially the same with the polymeric material or is finely dispersed to avoid light scattering. Such composite materials are a convenient and useful way to control the linear part of the refractive index in the individual layers.

The multilayered polymer films can be fabricated with a predetermined range of refractive indexes and with an arbitrarily small index difference between them. This may be done, for example, by altering the relative thickness of the layers (A) and (B). In instances where the elastic modulus of the polymer components (e.g., (a) and (b) and/or ($a_1$) and ($b_1$)) differ, the refractive index of the film can be varied mechanically via pressure, tension, compression or shear stresses or a combination of these stresses. As noted, the multilayer film can be fabricated so that one or both of the polymer components (e.g., (a) and (b) and/or ($a_1$) and ($b_1$)) is an elastomer. If the elastic modulus of the polymer components (e.g., (a) and (b) and/or ($a_1$) and ($b_1$)) differ, then the refractive index of one or more of the effective medium composite layers (A) and (B) is variable, relative to the other, mechanically via pressure, tension, compression or shear stresses or a combination of these stresses. The index gradient of the GRIN sheet can therefore be varied via tension, compression or shear forces. The refractive index and refractive index gradient changes can also be achieved by any type of mechanical or electrical stimulus, or by magnets attached to the multilayer polymeric composite structure. The changes can be induced by electrostatic effects or by using electroactive or electrooptic component polymers. This provides the materials with a large electro-optical response.

The multilayered polymer films can be fabricated by multilayered coextrusion or ordering through a feed block, multipliers/interfacial surface generators, and/or chaotic mixers. For example, the multilayered polymer films fabricated may be formed by forced assembly co-extrusion in which two or more polymers are layered and then multiplied several times or traditional multilayer coextrusion processing where layering is accomplished simultaneously in a single multilayered feed block. These processes can result in large area films (e.g., feet wide by yards wide) consisting of thousands of layers with individual layer thicknesses as thin as 5 nm. When the layer thickness is much less than the wavelength of light, the films behave as effective media and, thus, have unique properties compared to the constituents. The coextruded multilayer polymer films may have an overall thickness ranging from about 50 nm to about 10 cm, in particular from about 10 μm to about 3 cm including any increments within these ranges.

The multilayered polymer films comprising layers (A) and (B) can be stacked to form a hierarchical multilayered composite GRIN sheet. The GRIN sheet may, for example, be formed by layering the multilayered polymer films in a hierarchical structure as described and disclosed in U.S. Pat. No. 6,582,807, issued Jun. 24, 2003 to Baer et al. and U.S. Pat. No. 7,002,754, issued Feb. 21, 2006, to Baer et al, which are incorporated herein by reference in their entirety. By layering the multilayered polymer composite films, the hierarchical GRIN sheet is given a refractive index gradient. The layering can be done so that the resulting hierarchical GRIN sheet has an index gradient in any direction, such as the axial, radial or spherical direction. The index gradient can be continuous, discrete or stepped. Many gradients can be achieved within the limits imposed by the index of the polymer components (e.g., (a) and (b) and/or ($a_1$) and ($b_1$)) of the layers (A) and (B) in the multilayered polymer films.

In any case, adjacent multilayered polymer films can be chosen to exhibit progressively different refractive indexes. For example, stacking 5 to 100,000 multilayered polymer composite films will form a hierarchical GRIN sheet from which GRIN lenses can be fabricated as described below. The index gradient of the hierarchical GRIN sheet is determined by the design in which the multilayered polymer films are stacked. A particular advantage of this process is that any predetermined index gradient can be easily achieved using multilayered polymer composite films. The index gradient is limited only by the available refractive index range in the multilayered polymer films. Due to the aforementioned construction of the GRIN sheet, the sheet has a hierarchical structure on the nanometer scale, micrometer scale, and the centimeter scale.

In some embodiments of the application, the multilayer polymer film can be made from two alternating layers (A) and (B) (e.g., ABABA . . . ) that are formed, respectively, of polymer components (a) and (b) for layer (A) and polymer components ($a_1$) and ($b_1$) for layer (B). The component polymers (a) and (b) and/or ($a_1$) and ($b_1$) can exhibit different refractive indexes and form a multilayer polymer film represented by formula $(AB)_x$, where $x=(2)^n$, and n is the number of multiplier elements and is in the range of from 4 to 18. In other embodiments, the alternating layers A and B can be provided in a multilayer polymer c film represented by formula $(ABA)_x$ or $(BAB)_x$, where $x=(2)^n+1$, and n is the number of multiplier elements and is in the range of 2 to 18.

In some embodiments, polymer components (a) and (b) and/or ($a_1$) and ($b_1$) can be independently glassy polymeric materials, crystalline polymeric materials, elastomeric polymeric materials, or blends thereof. By way of a non-binding example, when component (a) or ($a_1$) is a glassy material, component (b) or ($b_1$) can be an elastomeric material, a glassy material, a crystalline material or a blend thereof. Alternatively, when component (a) or ($a_1$) is an elastomeric material, component (b) or ($b_1$) can be an elastomeric material, a glassy material, a crystalline material or a blend thereof. Regardless, component (a) and/or ($a_1$) can exhibit a different refractive index than component (b) and/or ($b_1$); likewise, layer (A) can exhibit a different refractive index than layer (B).

The multilayered polymer film can include a multitude of alternating layers (A) and (B). In some examples, the multilayer polymer composite film can include at least 10 alternating layers (A) and (B), preferably from about 50 to about 500,000 alternating layers, including any increments within these ranges. Each of the layers (A) and (B) may be microlayers or nanolayers. Similarly, additional multilayered polymer films may be formed comprised of layers ($A_i$) and ($B_i$), which layers are comprised of components ($a_i$) and ($b_i$), respectively. The components (a), ($a_1$), and ($a_i$) can be the same or different polymeric materials. Likewise, (b), ($b_1$), and ($b_i$) can be the same or different polymeric materials.

The multilayer polymer film may alternatively include more than two different layers. For example, a three layer structure of alternating layers (A), (B), and (C) (e.g., ABCABCABC . . . ) of, respectively, components (a) and (b), ($a_1$) and ($b_1$), and ($a_2$) and ($b_2$). A structure that includes any number of different layers in any desired configuration and combination is included within the scope of the present invention, such as (CACBCACBC . . . ).

The multilayer polymer films can be formed into a multilayer composite GRIN sheet by stacking the multilayer polymer films that have differing refractive indexes. The stacked multilayer polymer films can then be consolidated using heat and/or pressure to form a substantially optically transparent multilayer composite GRIN sheet. In some embodiments, the multilayer polymer films can be consolidated to form the multilayer composite GRIN sheet using autoclave consolidation techniques. In other embodiments, the multilayer polymer films can be consolidated using adhesive or adhesive layers that bind the stacked individual multilayer polymer films.

The consolidated multilayer composite GRIN sheet can be used to form a consolidated multilayered GRIN optical material. In some embodiments, the consolidated multilayered GRIN optical material can include just the multilayer composite GRIN sheet. In other embodiments, the consolidated multilayered GRIN optical material can include other multilayer composite GRIN sheets and/or other layers. Such other multilayer composite GRIN sheets and/or other layers can have compositions that allow the optical properties of the consolidated multilayered GRIN optical material to be varied. For example, the consolidated multilayered GRIN optical material can include a reflector layer, such as shown in FIG. 4 that is bonded to, consolidated with, and sandwiched between multilayer composite GRIN sheets having different composition. In other examples, the consolidated multilayered GRIN optical material can include a filter layer that is bonded to and/or consolidated with the multilayer composite GRIN sheet. Other additional layers, materials, sheets, and/or objects, can be provided with or consolidated with the multilayer composite GRIN sheet to vary the optical properties of the consolidated multilayered GRIN optical material.

In some embodiments, the consolidated multilayered GRIN optical material can be formed into a GRIN lens that has any predetermined spherical or aspherically symmetric axial or radial GRIN distribution. The consolidated multilayered GRIN optical material may be formed into a spherical or an aspherical shape by heating the consolidated multilayered GRIN optical material to a temperature below the lowest melting temperature of any of the polymers within the consolidated multilayered GRIN optical material. The heated consolidated multilayered GRIN optical material can then be thermoformed in a die or mold forming the consolidated multilayered GRIN optical material into a spherical or an aspherical surface shape that is maintained when the heated consolidated multilayered GRIN optical material cools. Alternatively or additionally, the consolidated multilayered GRIN optical material can be mechanically or chemically shaped by a suitable process, such as etching, patterning, diamond machining, metallurgical polishing, glass bead honing and the like, or a combination of diamond machining followed by metallurgical polishing or glass bead honing or the like to shape the consolidated multilayered GRIN optical material into a spherical or an aspherical shape configuration.

Depending on the particular polymeric construction of the GRIN lens, the lens may be reversibly deformable or irreversible deformable. Accordingly, by using multilayered polymer technology, the lens can be fabricated such that the gradient is varied dynamically and reversibly. This is accomplished, for example, by using dynamically variable multilayer polymeric components as the individual layers. In particular, alternation polymer layers can be fabricated such that the elastic moduli as well as the index of refraction of the alternating polymer layers are different. In these materials, applied stress, such as pressure, tension, compression or sheer stresses or a combination of these stresses, changes the relative layer thickness and, thus, changes the gradient in the lens.

The refractive index and refractive index gradient changes can also be achieved by any type of mechanical or electrical stimulus, or by magnets attached to the multilayer polymeric structure. The changes can be induced by electrostatic effects or by using electroactive or electrooptic component polymers. This provides the materials with a large electro-optical response. The sensitivity of the index to stress can be varied by the choice of the polymer components (e.g., (a) and (b) and/or ($a_1$) and ($b_1$)) and layers (A) and (B) relative initial thickness. Therefore, it is possible to fabricate a variable gradient lens where both the initial gradient and the variability of the gradient with stress can be predetermined.

Optionally, the gradient of the spherical or aspherical GRIN lens can varied, reversibly or irreversibly, by axially orienting (e.g., stretching) the hierarchical GRIN sheet and/or multilayered polymer composite film during and/or after fabrication. As pointed out above, the multilayer polymer film and hence the consolidated multilayer composite GRIN sheet can be fabricated so that one or both of the component polymers is an elastomer. Axial orientation of the multilayer polymer composite film and/or hierarchical GRIN sheet in at least one direction parallel can vary the gradient distribution of the film or sheet. In one example, a multilayer polymer composite film can be biaxially oriented by stretching the film in a plane that is substantially parallel to a surface of the film. It will be appreciated that although the film can be biaxially oriented by stretching the film in at least two directions, the film can also be stretched in a single direction (e.g., uniaxially oriented) or stretched in multiple directions (e.g., biaxially or triaxially oriented).

In fabricating GRIN lenses, it is also desirable to be able to specify the index gradient from less than 0.01 to as large as possible. With the multilayering technique described herein, a wide variety of index gradients are possible. Since a larger gradient gives a wider range of GRIN lenses that can be made, it is desirable to be able to make a large gradient. This enables a shorter focal length and more aberration correction in a thinner GRIN lens. For multilayered GRIN lenses, the index gradient can be specified from a minimum of 0.001 to a maximum of the difference in refractive index between the polymers constituting the layers. Often the largest possible range is desirable. Preferably, the lens of the multilayer polymeric structure can exhibit an index gradient of 0.01 or higher, preferably in the range of from 0.02 to 2.0, more preferably in the range of from 0.05 to 0.5, including all increments within these ranges.

An important point is that the multilayering technique described herein allows the use of miscible, immiscible or partially miscible polymers to achieve a large index difference. Other GRIN lens fabrication techniques use diffusion techniques to achieve an index gradient. Thus, the examples in the prior art are limited to small index gradients of 0.01 to 0.03.

A second important point is that GRIN lenses can be designed to be used as optical elements over a wide wavelength range from near 40 nm to 1 meter. The specific wavelength range is determined by the polymeric components. In an embodiment of the application, the multilayer polymer structure exhibits an external transmission of at least 20%, 50%, 60%, 70%, 80%, 81%, 82%, 83%, 84%, 85%, 86%, 87%, 88%, 89%, 90%, or 91% at a wavelength of 633 nm as measured using UV-VIS spectrometry. A transparent consolidated multilayered GRIN optical material can be fabricated with a range of refractive indices by appropriate layering of the components. If the layer thickness of each layer is sufficiently thin, the composite behaves as an effective medium. The refractive index can be designed to exhibit any value between the indexes of the component polymers by selecting the relative thickness of the component layers. Such a composite can be made with a transparency comparable to the component polymers.

The GRIN lens described herein can be used in a wide range of applications. For example, the GRIN lens may be used in imaging applications, such as small camera applications including but not limited to camera phones, surveillance cameras, medical imaging tools (e.g., endoscopes), and military imaging (e.g., scopes, space cameras) as well as non-image forming systems, such as energy collection devices, solar cells, solar collectors, solar concentrators, beam shaping devices, and other devices that require a lens with very short or very long (infinite) focal lengths. Furthermore, the GRIN lens may be used in biological implants such as synthetic copies of human lenses to produce implantable devices for human or animal vision.

The following Examples describes a discovery in formulation and processing of nanolayered polymer films containing one or more blend polymer blends that reduces internal optical inclusion formed as a result of film consolidation resulting in a significant increase in consolidated part optical properties including light transmission and optical scattering.

EXAMPLE 1

Higher optical transmission/lower scattering GRIN sheets were fabricated, via autoclave consolidation under heat and pressure, from nanolayered PMMA/SAN17 films comprised of intralayer blends. The incorporation of a blend of PMMA & SAN17 in each film layer, FIG. 1, was conducted to reduce film-film stresses that resulted in GRIN sheet consolidation from the high interfacial forces in nanolayered films comprised solely of homogenous SAN17 or PMMA layers. Pre-blending of PMMA and SAN17 resins pellets was conducted prior to adding the material to the coextrusion system. The ratio of PMMA and SAN17 material in each layer blend was calculated to mimic the overall film composition (i.e., 50/50 blend or 60/40 blend in each layer) and pellets of PMMA and SAN17 were sufficiently mixed by hand before feeding the material into the extruder. Multilayer coextruson of a nanolayered film composed of 4097 layers (11 multilplier dies in an ABA structure) was accomplished at an extrusion temperature of 230 C. LDPE skin layers were added to the nanolayered blend film before casting to a 50 micron thickness on a 65 C heated film roll.

Figure 2:
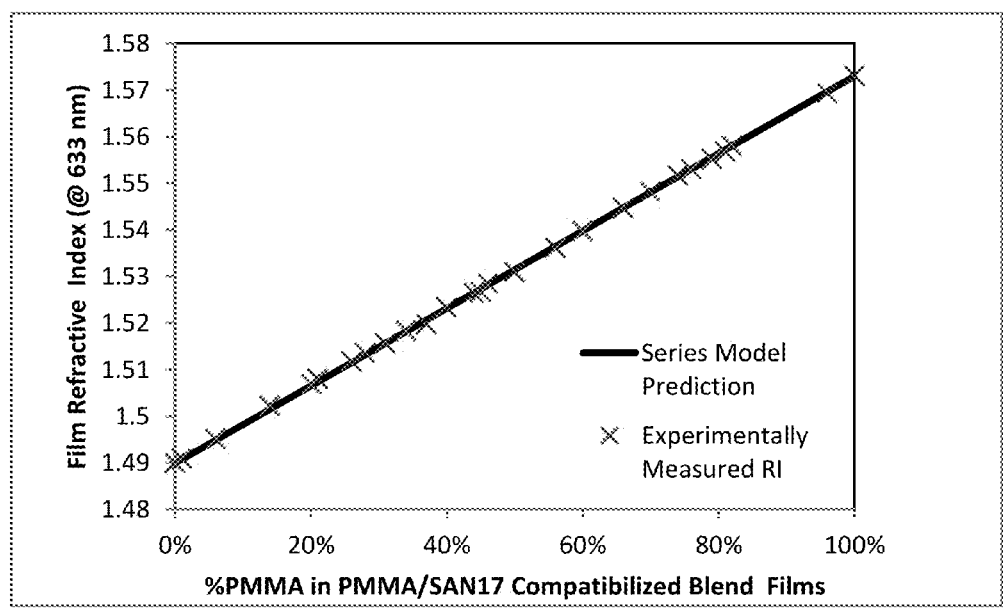
FIG. 2 illustrates a plot showing refractive indexes of 4097 intra-layer blend films comprised of PMMA/SAN17.

Optical measurements of the 4097 layer PMMA/SAN17 blend films were taken to assess the bulk film refractive index and transparency. As shown by FIG. 2, the bulk film refractive index followed a compositional dependent additive model indicative of the homogenous (non-blend) nanolayered PMMA/SAN17 films. External optical transmission of the individual nanolayered blend films was measured with a UV-US spectrometer and showed the films maintained a transparency greater than 90% at all film compositions, Table 1. Following optical characterization, the nanolayered intra-layer blend films were consolidated into sheets and characterized for utilization as high quality optical materials, as shown in FIG. 3.

Consolidation of GRIN sheets was achieved by subsequently stacking approximately 100 individual nanolayered intra-layer blend films, after removal of the LDPE skin layers, and compression under heat and pressure in an autoclave thermoformer. A comparison of consolidated sheet optical properties was completed by stacking and compressing 100 individual nanolayered films of PMMA/SAN17 with either homogenous or blend intra-layer morphologies. Compression of both sheets was completed in an autoclave thermoformer at 125 C. The resultant measurement of optical transmission through the sheets showed that the intra-layer blend based consolidated sheets (89-90% transmission at 632 nm) was repeatedly and significantly higher than the homogenous layer PMMA/SAN17 films (75-80% transmission at 632 nm), Table 2. The mechanism for reduced intra-sheet transmission loss was elimination of internal sheet reflections in the intra-layer blend film consolidated sheets as compared to the homogenous layered film sheets.

The introduction of highly dispersed, polymer blends into homogenous or nanolayered film structures resulted in the production of polymer film materials, which could be utilized as a precursor material in high transmission optical product manufacturing. Similar to the layer approach, highly dispersed polymer blend materials can be produced through cast or blown film extrusion to produce meta-materials with a tailorable refractive index or optical dispersion (Abbe number) and utilized in the previously described film consolidation and forming process to manufacture polymer GRIN optics with film controllable refractive index or optical dispersion gradients through the thickness of the optic.

TABLE 1

Percentage transmission of 50 micron PMMA/SAN17 blend films measured at 633 nm via UV-vis spectroscopy

| Film Composition A/B | External Transmission 633 nm |
|---|---|
| SAN17/SAN17 | 91.5% |
| [34/66 PMMA/SAN17 blend]/[34/66 PMMA/SAN17 blend] | 91.7% |
| [50/50 PMMA/SAN17 blend]/[50/50 PMMA/SAN17 blend] | 92.8% |
| [66/34 PMMA/SAN17 blend]/[66/34 PMMA/SAN17 blend] | 91.9% |
| PMMA/PMMA | 92.7% |

TABLE 2

Comparison of optical transmission measured at 633 nm of consolidated PMMA/SAN17 GRIN sheet comprised of homogenous PMMA/SAN17 layers and blend layers of PMMA/SAN17. The overall composition of the PMMA/SAN17 layered film was held constant at 50/50 in both the homogenous and the blend layers cases

| Consolidated GRIN Sheet | Percentage Transmission at 633 nm |
|---|---|
| (50/50)PMMA/SAN17 - homogenous material layers | 79.9% |
| (50/50) PMMA/SAN17 - 50/50 blend layers | 88.9% |
| Δn = 0.08 (5 composition) PMMA/SAN17 blend layers | 87.9% |

TABLE 3

Refractive index of 4097 intra-layer blend films comprised of PMMA/SAN17 measured at 633 nm

| Composition (PMMA/SAN17) | Average RI @ 633 nm | Std Dev | Additive Model Prediction @ 633 nm |
|---|---|---|---|
| 19/81 | 1.55666 | 1.56E-04 | 1.56E+00 |
| 21/79 | 1.55516 | 1.68E-04 | 1.56E+00 |
| 24/76 | 1.55288 | 2.03E-04 | 1.55E+00 |
| 30/70 | 1.54813 | 1.77E-04 | 1.55E+00 |
| 34/66 | 1.54459 | 1.61E-04 | 1.54E+00 |
| 55/45 | 1.52660 | 2.30E-04 | 1.53E+00 |
| 63/37 | 1.51970 | 1.46E-04 | 1.52E+00 |
| 66/34 | 1.51835 | 2.40E-04 | 1.52E+00 |
| 69/31 | 1.51565 | 1.23E-04 | 1.52E+00 |
| 79/21 | 1.50798 | 9.76E-05 | 1.51E+00 |
| 94/6 | 1.49517 | 1.04E-04 | 1.49E+00 |
| 99/1 | 1.49094 | 1.24E-04 | 1.49E+00 |
| 4/96 | 1.5694 | 1.49E-04 | 1.57E+00 |
| 18/82 | 1.5580 | 1.35E-04 | 1.56E+00 |
| 26/74 | 1.5517 | 2.33E-04 | 1.55E+00 |
| 44/56 | 1.5361 | 1.73E-04 | 1.54E+00 |
| 50/50 | 1.5310 | 2.16E-04 | 1.53E+00 |
| 72/28 | 1.5136 | 2.64E-04 | 1.51E+00 |
| 80/20 | 1.5069 | 2.15E-04 | 1.51E+00 |
| 86/14 | 1.5022 | 1.62E-04 | 1.50E+00 |
| 0/100 | 1.5730 | 1.10E-04 | 1.57E+00 |
| 40/60 | 1.5397 | 2.40E-04 | 1.54E+00 |
| 44/56 | 1.5361 | 1.65E-04 | 1.54E+00 |
| 54/46 | 1.5284 | 2.77E-04 | 1.53E+00 |
| 56/44 | 1.5265 | 2.70E-04 | 1.53E+00 |
| 60/40 | 1.5233 | 2.81E-04 | 1.52E+00 |
| 74/26 | 1.5117 | 2.80E-04 | 1.51E+00 |
| 100/0 | 1.4899 | 1.20E-04 | 1.49E+00 |

EXAMPLE 2

Reduced Scattering in Laminated, Multilayered Blend Films of PMMA/SAN

Laminated 5 mm thick sheets comprised either (a) of 128 individual 50 micron, 4097 layer blend films or (b) of 128 individual 50 micron, 4097 layer homogenous layered films of PMMA and SAN were processed to compare part transmission at 633 nm. The layered film systems were processed as homogenous and blend nanolayered films to compare the effect of transmission with and without the blends. Systems examined included: (1) Arkema Plexiglas V920-100 and Ineos SAN Sparkle (SAN with 17% AN).

(2) Arkema Plexiglas V920-100 and BASF Luran 348Q (SAN with 18% AN).

(3) Arkema Plexiglas V920-100 and Chi Mei Kibisan PN-107 (SAN with 19% AN).

(4) Evonik 7N Plexiglas and Ineos SAN Sparkle

TABLE 4

Light transmission measured through 5 mm thick laminated sheets comprised of 128 individual (a) homogenous or (b) blend nanolayered films.

| | % Sheet Transmission @ 633 nm | |
|---|---|---|
| Nanolayered Film System | (a) Homogenous Nanolayers | (b) Blend Nanolayers |
| Arkema Plexiglas V920/Ineos Sparkle | 79.3 | 87.6 |
| Arkema Plexiglas V920/BASF Lustran 348Q | 79.7 | 87.8 |
| Arkema Plexiglas V920/Chi Mei Kibisan PN-107 | 80.8 | 87.4 |
| Evonik 7N Plexiglas/Ineos Sparkle | 79.9 | 89.0 |

EXAMPLE 3

Reduced Scattering in Laminated, Multilayered Blend Films of PC/OKP4

Laminated 5 mm thick sheets comprised either (a) of 128 individual 50 micron, 4097 layer blend films or (b) of 128 individual 50 micron, 4097 layer homogenous layered films of polycarbonate (PC) and an aromatic polyester (OKP4) were processed to compare part transmission at 633 nm. The layered film systems were processed as homogenous and blend nanolayered films to compare the effect of transmission with and without the blends.

TABLE 5

Light transmission measured through 5 mm thick laminated sheets comprised of 128 individual (a) homogenous or (b) blend nanolayered films of PC/OKP4.

| | % Sheet Transmission @ 633 nm | |
|---|---|---|
| Nanolayered Film System | (a) Homogenous Nanolayers | (b) Blend Nanolayers |
| Bayer APEC 201-15/Osaka Gas Company OKP4 | 78.4 | 82.9 |

EXAMPLE 4

Fabrication of Plano-convex Gradient Refractive Index Lens with Internally Incorporated Visible Wavelength Filter Combining transparent and reflective multilayered films during lamination of GRIN was completed to demonstrate capabilities to produce filtering or bandpass lenses without the use of optical coatings or reliance on any external parts (i.e., other optics or apertures). Incorporation of a 256 layer PMMA/PVDF 50 micron coextruded polymer film into a series of variable refractive index Arkema Plexiglas V920-100/Ineos Sparkle nanolayered films was accomplished via thermoforming. Subsequent laminate shaping into a meniscus lens shape via thermoforming and one-sided, for case (a) plano convex, or two-sided, for case (b) flat lens, polishing was completed to form the final GRIN optic. Inclusion of the multilayered reflector film, chosen to have an optical reflective peak in the visible spectrum of light, resulted in the optic providing optical filtering (low transmission at visible wavelengths, while maintaining high optical throughput >80% at longer test wavelengths as in the short wave infrared (SWIR). It should be noted the annular inclusion of the reflective polymer film.

TABLE 6

Light transmission measured through a plano-convex GRIN lens with internal visible wavelength filter and a flat, GRIN lens with an internal annular visible wavelength reflective multilayer layer film ring

| | | % Light Transmission | | | |
|---|---|---|---|---|---|
| | | 552 nm | | 980 nm | |
| Lens ID | Description | Lens Center | Lens Edge | Lens Center | Lens Edge |
| 081712-R1-1 | Plano-convex, Δn = 0.04 lens with reflective PMMA/PVDF multilayer film | 14.0% | 69.8% | 69.2% | 80.0% |
| 081312-R1-1 | Flat, Δn = 0.04 lens with annular reflective PMMA/PVDF multilayer film ring | 81.0% | 20.9% | 80.6% | 74.4% |

Numerous modifications and variations of the present invention are possible in light of the above teachings. It is therefore to be understood that within the scope of the appended claims, the invention may be practiced otherwise than as specifically described herein. The preferred embodiments of the invention have been illustrated and described in detail. However, the present invention is not to be considered limited to the precise construction disclosed. Various adaptations, modifications and uses of the invention may occur to those skilled in the art to which the invention relates and the intention is to cover hereby all such adaptations, modifications, and uses which fall within the spirit or scope of the appended claims.

Having described the invention, I claim:

1. A consolidated multilayered GRIN optical material comprising a multilayered composite GRIN sheet that includes a plurality of consolidated coextruded multilayered polymer films; wherein each of the multilayered polymer films includes a plurality of at least two alternating layers (A) and (B) represented by formula $(AB)_x$, where $x=2^n$, and n is in the range of from 4 to 18; wherein layer (A) includes a first blend of polymer components and layer (B) includes a second blend of polymer components, wherein the multilayered composite GRIN sheet has an external optical transmission of at least 80% at a wavelength of 633 nm measured using UV-VIS spectroscopy and is free of intralayer polymer domains at least 1 micron size scale in any dimension.

2. The material of claim 1, wherein the first blend of polymer components includes polymer component (a) and polymer component (b) and the second blend of polymer components includes polymer components $(a_1)$ and $(b_1)$, and wherein polymer component (a) is same as polymer component $(a_1)$ and polymer component (b) is the same as polymer component $(b_1)$.

3. The material of claim 2, wherein the ratio of polymer components (a) and (b) in layer (A) is substantially equal to the ratio of polymer components $(a_1)$ and $(b_1)$ in layer (B).

4. The material of claim 1, wherein the multilayered composite GRIN sheet has an external optical transmission of at least 85% at a wavelength of 633 nm measured using UV-VIS spectroscopy.

5. The material of claim 1, wherein the layers (A) and (B) each have thicknesses of from 5 nm to 1,000 nm.

6. The material of claim 1, wherein the multilayered composite polymer films are stacked in ordered layers to form a hierarchical multilayered composite GRIN sheet; and wherein adjacent multilayered composite polymer films are selected to exhibit progressively different refractive indexes.

7. The material of claim 1, wherein the multilayered composite polymer film comprises in the range of from 50 to 500,000 alternating layers.

8. The material of claim 1, wherein the multilayered composite GRIN sheet is comprised of from 5 to 100,000 multilayered polymer composite films.

9. The material of claim 1, wherein the polymer components are individually selected from the group consisting of a polyethylene naphthalate, an isomer thereof, a polyalkylene terephthalate, a polyimide, a polyetherimide, a styrenic polymer, a polycarbonate, a poly(meth)acrylate, a cellulose derivative, a polyalkylene polymer, a fluorinated polymer, a chlorinated polymer, a polysulfone, a polyethersulfone, polyacrylonitrile, a polyamide, polyvinylacetate, a polyetheramide, a styrene-acrylonitrile copolymer, a styrene-ethylene copolymer, poly(ethylene-1,4-cyclohexylenedimethylene terephthalate), polyvinylidene difluoride, an acrylic rubber, isoprene, isobutylene-isoprene, butadiene rubber, butadiene-styrene-vinyl pyridine, butyl rubber, polyethylene, chloroprene, epichlorohydrin rubber, ethylene-propylene, ethylene-propylene-diene, nitrile-butadiene, polyisoprene, silicon rubber, styrene-butadiene, urethane rubber, and polyoxyethylene, polyoxypropylene, and tetrafluoroethylene hexafluoropropylene vinylidene (THV), aromatic polyesters, aromatic polyamides, and ethylene norbornene copolymers.

10. The material of claim 1, wherein the layers further comprise an organic or inorganic material designed to affect the refractive index.

11. The material of claim 1, exhibiting an index gradient in the range of from 0.02 to 2.0.

12. The material of claim 1, wherein the polymer components are miscible, immiscible or partially miscible polymeric materials.

13. The material of claim 1, further comprising at least one reflector or filter layer.

14. A GRIN lens comprising the consolidated multilayered GRIN optical material of claim 1.

15. A method of fabricating a gradient refractive index (GRIN) lens comprising:
extruding a first polymer blend and a second polymer blend to form a plurality multilayered polymer composite film, each of the multilayered polymer films includes a plurality of at least two alternating layers (A) and (B) represented by formula $(AB)_x$, where $x=2^n$, and n is in the range of from 4 to 18; wherein layer (A) includes a first blend of polymer components and layer (B) includes a second blend of polymer components;
consolidating the plurality of the multilayered polymer films into a multilayer composite GRIN sheet, the multilayered composite GRIN sheet has an external optical transmission of at least 80% at a wavelength of 633 nm measured using UV-VIS spectroscopy and is free of intralayer polymer domains at least 1 micron size scale in any dimension; and
shaping the multilayered composite GRIN sheet into a GRIN lens.

16. The method of claim 15, wherein at least two the co-extruded multilayered polymer films that are consolidated to form the multilayer composite GRIN sheet have different refractive indexes.

17. The method of claim 15, wherein the multilayered polymer films are stacked in ordered layers to form a hierarchical multilayered composite GRIN sheet; and wherein adjacent multilayered composite polymer films are chosen to exhibit progressively different refractive indexes.

18. The method of claim 15, the first blend of polymer components includes polymer component (a) and polymer component (b) and the second blend of polymer components includes polymer components $(a_1)$ and $(b_1)$, and wherein polymer component (a) is same as polymer component $(a_1)$ and polymer component (b) is the same as polymer component $(b_1)$.

19. The method of claim 18, wherein the ratio of polymer components (a) and (b) in layer (A) is substantially equal to the ratio of polymer components $(a_1)$ and $(b_1)$ in layer (B).

20. The method of claim 15, wherein the layers (A) and (B) each have thicknesses of from 5 nm to 1,000 nm.

21. The method of claim 15, wherein the multilayered polymer film comprises in the range of from 50 to 500,000 alternating layers.

22. The method of claim 15, wherein the multilayered composite GRIN sheet is comprised of from 5 to 100,000 multilayered polymer composite films.

23. The method of claim 15, wherein the polymer components are individually selected from the group consisting of a polyethylene naphthalate, an isomer thereof, a polyalkylene terephthalate, a polyimide, a polyetherimide, a styrenic polymer, a polycarbonate, a poly(meth)acrylate, a cellulose derivative, a polyalkylene polymer, a fluorinated polymer, a chlorinated polymer, a polysulfone, a polyethersulfone, polyacrylonitrile, a polyamide, polyvinylacetate, a polyetheramide, a styrene-acrylonitrile copolymer, a styrene-ethylene copolymer, poly(ethylene-1,4-cyclohexylenedimethylene terephthalate), polyvinylidene difluoride, an acrylic rubber, isoprene, isobutylene-isoprene, butadiene rubber, butadiene-styrene-vinyl pyridine, butyl rubber, polyethylene, chloroprene, epichlorohydrin rubber, ethylene-propylene, ethylene-propylene-diene, nitrile-butadiene, polyisoprene, silicon rubber, styrene-butadiene, urethane rubber, and polyoxyethylene, polyoxypropylene, and tetrafluoroethylene hexafluoropropylene vinylidene (THV), aromatic polyesters, aromatic polyamides, and ethylene norbornene copolymers.

24. The method of claim 15, wherein the layers further comprise an organic or inorganic material designed to affect the refractive index.

25. The method of claim 15, wherein the polymer components are miscible, immiscible or partially miscible polymeric materials.

* * * * *